United States Patent
Heinzemann et al.

(10) Patent No.: US 12,214,780 B2
(45) Date of Patent: Feb. 4, 2025

(54) METHOD FOR CONTROLLING A VEHICLE

(71) Applicant: Robert Bosch GmbH, Stuttgart (DE)

(72) Inventors: Christian Heinzemann, Ludwigsburg (DE); Andreas Heyl, Weil der Stadt (DE); Christoph Gladisch, Renningen (DE); Jens Oehlerking, Stuttgart (DE); Martin Butz, Steinheim an der Murr (DE); Martin Herrmann, Korntal (DE); Michael Rittel, Markgroeningen (DE); Nadja Schalm, Renningen (DE); Tino Brade, Muldestausee (DE)

(73) Assignee: ROBERT BOSCH GMBH, Stuttgart (DE)

( * ) Notice: Subject to any disclaimer, the term of this patent is extended or adjusted under 35 U.S.C. 154(b) by 326 days.

(21) Appl. No.: 17/504,380

(22) Filed: Oct. 18, 2021

(65) Prior Publication Data
US 2022/0176949 A1 Jun. 9, 2022

(30) Foreign Application Priority Data
Dec. 9, 2020 (DE) .......................... 102020215545.3

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0953* (2013.01); *B60W 30/0956* (2013.01);
(Continued)

(58) Field of Classification Search
None
See application file for complete search history.

(56) References Cited

U.S. PATENT DOCUMENTS

| 11,173,903 | B2 * | 11/2021 | Wang | B60W 30/16 |
| 2010/0114633 | A1 * | 5/2010 | Sislak | G08G 5/045 |
| | | | | 701/120 |

(Continued)

FOREIGN PATENT DOCUMENTS

| DE | 102017207257 A1 | 10/2018 |
| DE | 102017216801 A1 | 3/2019 |

(Continued)

*Primary Examiner* — Jaime Figueroa
*Assistant Examiner* — Atticus A Cameron
(74) *Attorney, Agent, or Firm* — NORTON ROSE FULBRIGHT US LLP; Gerard A. Messina

(57) ABSTRACT

A method for controlling a vehicle. In the method, data of a digital road map are read in, zones are determined for the digital road map, and possible sequences of trips along a road of the digital road map are ascertained as a function of the determined zones. Furthermore, it is ascertained, as a function of sensor data and/or current driving data of the vehicle, whether a current or predicted traffic situation is outside the possible sequences or corresponds to a possible sequence that is determined as being outside an intended operating range. If the current or predicted traffic situation is outside the possible sequences or corresponds to the possible sequence outside the intended operating range, a measure is determined and the vehicle is controlled as a function of the measure that is taken.

24 Claims, 15 Drawing Sheets

(51) Int. Cl.
*B60W 30/18* (2012.01)
*B60W 40/04* (2006.01)
*B60W 40/12* (2012.01)
*B60W 50/00* (2006.01)
*B60W 60/00* (2020.01)
*G01C 21/34* (2006.01)

(52) U.S. Cl.
CPC ........ *B60W 40/04* (2013.01); *B60W 50/0097* (2013.01); *B60W 60/0015* (2020.02); *G01C 21/3415* (2013.01); *B60W 2552/53* (2020.02)

(56) References Cited

U.S. PATENT DOCUMENTS

2019/0084571 A1* 3/2019 Zhu ................ B60W 30/18163
2019/0317508 A1* 10/2019 Zhang .............. G08G 1/096725

FOREIGN PATENT DOCUMENTS

DE 102018214999 A1 4/2019
DE 102020207911 A1 12/2020

* cited by examiner

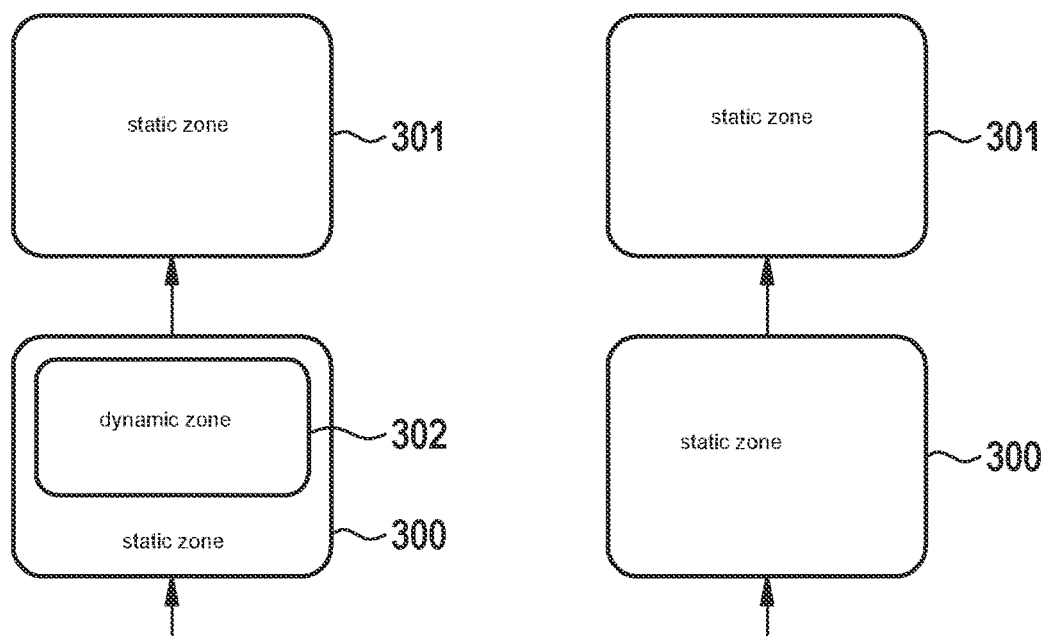
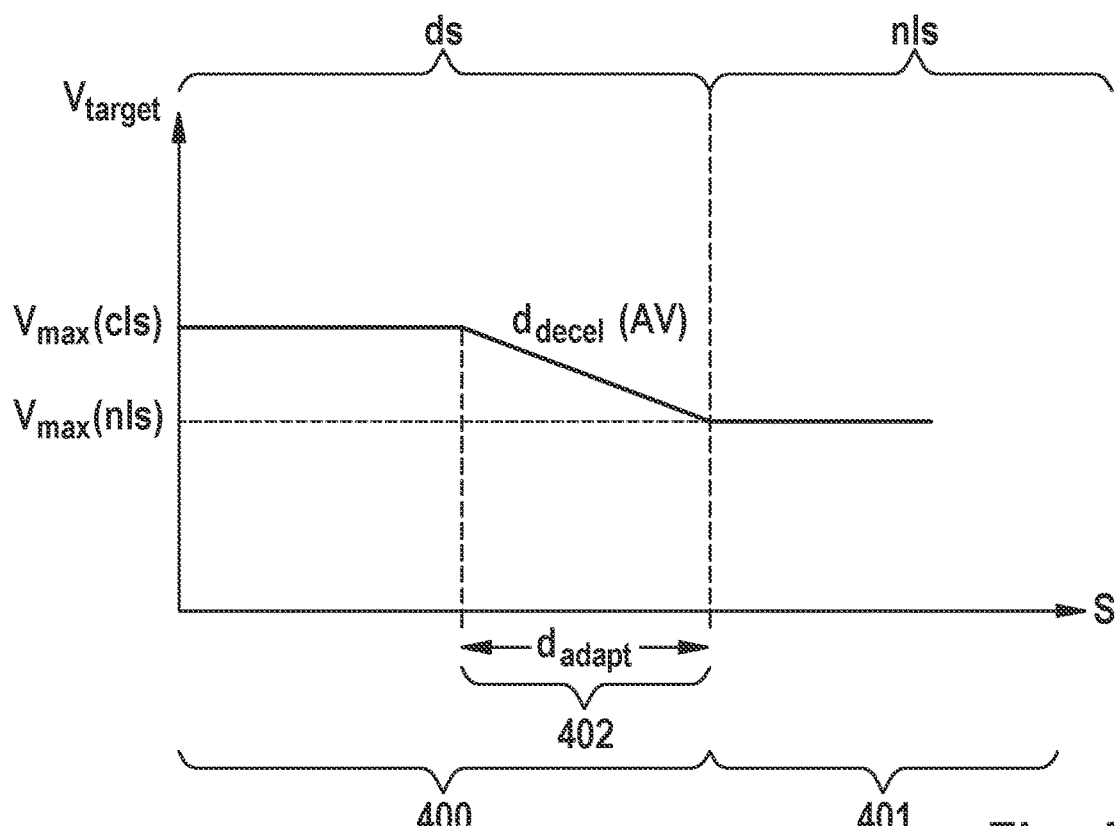

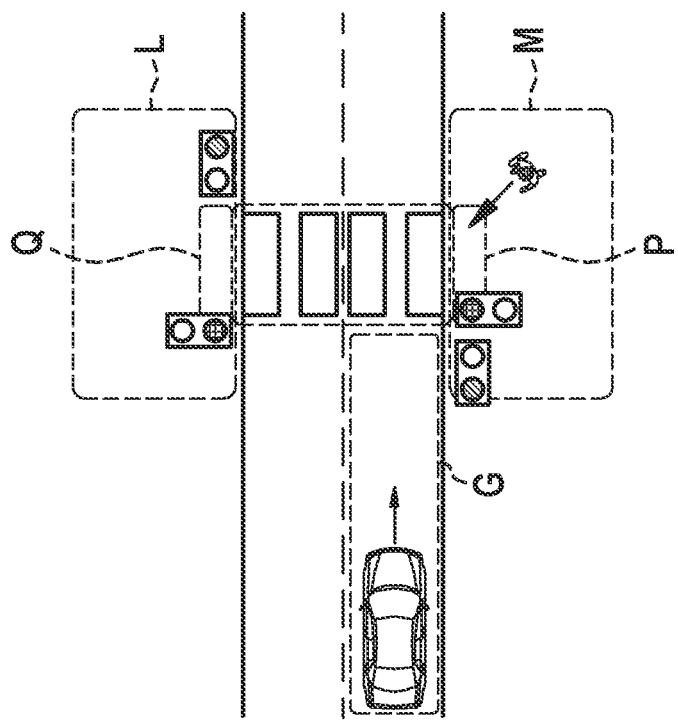
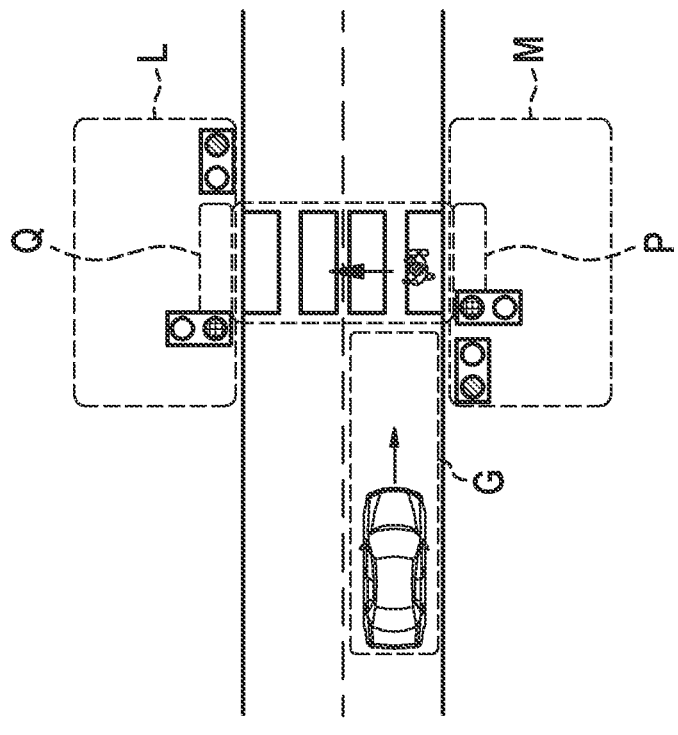
Fig. 18

METHOD FOR CONTROLLING A VEHICLE

CROSS REFERENCE

The present application claims the benefit under 35 U.S.C. § 119 of German Patent Application No. DE 102020215545.3 filed on Dec. 9, 2020, which is expressly incorporated herein by reference in its entirety.

FIELD

The present invention relates to a computer-implemented method for controlling a vehicle, in particular for behavior planning or trajectory planning or maneuver planning for an at least semi-autonomous vehicle, and for controlling the at least semi-autonomous vehicle as a function of the behavior planning or trajectory planning or maneuver planning.

BACKGROUND INFORMATION

An important element in the development of highly-automated or autonomous vehicles is the protection of the driving functions for the greatest possible number of situations and scenarios. The protection is intended to ensure that vehicle systems in the particular situations meet certain requirements, in particular safety requirements, and thus provide for a desired setpoint behavior of the vehicle.

Among the conventional methods, there are fixed scenario catalogs, for example, which describe a fixed set of examples of sequences, usually country-specific. However, on this basis it is hardly possible to determine a level of coverage for the protection, even using ontologies. In addition, very long scenario lists are needed quickly in order to be able to achieve only a minimum level of coverage.

Other measures for protection include evaluations of accident databases or endurance runs using test drivers. In both methods, coverage is highly subject to chance, and in particular the latter method is also very complicated and costly.

A variation of primarily physical parameters of a given simulation scenario may take place via "fuzzing" or optimization-based testing (search-based testing, for example). However, no systematic abstraction of existing traffic situations takes place, so that here as well it is very difficult to determine a level of coverage.

In addition to simulative tests of vehicle systems, it is also possible to use models or simulations in the vehicle online to achieve suitable behavior planning or trajectory planning or maneuver planning for controlling the vehicle.

A method and a device for creating and providing a highly accurate map are described in German Patent Application No. DE 10 2017 207257 A1. A device for protecting diagnostic commands to a control unit is described in German Patent Application No. DE 10 2018 214999 A1. German Patent Application No. DE 10 2017 216801 A1 describes a method for monitoring at least one component of a motor vehicle that is used for trajectory planning.

A method for controlling a vehicle is described in German Patent Application No. DE 10 2019 209 544, in which zones are derived from a digital road map, and possible sequences of driving or traffic situations are determined for these zones.

In the context of automated driving, the term "operational design domain" (ODD), an intended operating range, is important. This refers to the range of an operation of the vehicle, for which the vehicle has been developed and in which proper and safe operation of the vehicle is thus to be expected. For example, tests regarding the functional safety of a vehicle concentrate on this range.

SUMMARY

In accordance with the present invention, computer-implemented method for controlling a vehicle is provided. In accordance with an example embodiment of the present invention, the method includes the following steps:
reading in data of a digital road map,
determining zones for the digital road map,
ascertaining possible sequences of trips along a road on the digital road map as a function of the determined zones,
ascertaining, as a function of sensor data and/or current driving data of the vehicle, whether a current or predicted traffic situation is outside the possible sequences or corresponds to a possible sequence that is determined as being outside an intended operating range,
if the current or predicted traffic situation is outside the possible sequences or corresponds to the possible sequence outside the intended operating range, a computer-implemented safety monitor in the vehicle takes a measure,
controlling the vehicle as a function of the measure that is taken.

The digital road map may be a detailed road map, but may also be provided by data of an abstract road diagram. It may in particular contain information concerning at least one road or open space, for example concerning roadway width, roadway boundaries, positions or extents of a road or open space, curve radii, lane markings, intersections, traffic lights, and traffic signs.

With the method in accordance with an example embodiment of the present invention, potentially hazardous deviations from traffic situations provided within the scope of the vehicle development may be systematically identified using a zone-based approach. The computer-implemented safety monitor used for this purpose may be used together with, but also without, a zone-based behavior planner or trajectory planner. One particular advantage of the described methods is that the location and the dynamic behavior of other road users are specifically taken into account by correlating them with the assumptions and limitations from a morphological analysis. In particular, (portions of) traffic situations that were not part of the zone modeling and the morphological analysis may be identified.

During operational runtime, the methods may utilize information from zone graphs and a SCODE analysis, which have been created in the development of vehicle functions, based on system analyses. Assumptions, requirements, models, etc., that are used by a behavior planner or trajectory planner, for example for decision-making, may be taken into account. Based on a system analysis of the vehicle at the time of development, assumptions are made which are used in assessing the functional safety. With the described methods, models that contain these assumptions may be used during vehicle operational runtime in order to establish when the system departs from a safe context, and to trigger or propose a safe and proactive system response thereto.

As a result, safety and availability of the vehicle system are increased, risky or unsafe situations are avoided due to proactive behavior, and situations for which the system has not been developed are handled in a safe manner.

In one preferred embodiment of the present invention, the ascertainment of whether the current or predicted traffic situation is outside the possible sequences includes an ascertainment of whether a detected object, in particular a road user, outside the designated zones may be relevant for the current or predicted driving situation due to its determined or assumed movement.

In a further preferred embodiment of the present invention, the ascertainment of whether the current or predicted traffic situation is outside the possible sequences includes an ascertainment of whether a detected object, in particular a road user, is situated within one of the designated zones in which it is not expected.

In further preferred embodiments of the present invention, the measure that is taken includes an alternative response for the vehicle or an alternative behavior of the vehicle, in particular an initiation of a safety maneuver for the vehicle, a generation of an additional possible sequence, as a function of which the vehicle is controlled, or an output of a piece of information to a behavior planning system or a trajectory planning system of the vehicle.

Due to an existing zone abstraction, the safety monitor may be able to dynamically generate one or multiple additional zones or adapt the size of existing zones, and thus compute conditions for a safe alternative response of the vehicle.

The safety monitor may likewise provide, propose, or initiate a safe alternative driving maneuver which avoids risk for the vehicle and optionally transfers it into a safe state. The reliability of such an alternative response may in turn be checked against the zones. For example, in the case of an emergency braking operation that is provided as an alternative response due to another vehicle outside the intended operating range, this operation may be rejected if the passengers of the vehicle in question are not endangered without the alternative response, but there is risk of a severe accident with a third vehicle as a result of the alternative response.

The safety monitor may also output, in particular to a behavior planner or trajectory planner, a signal that a departure from an intended operating range is occurring or has occurred.

In preferred embodiments of the present invention, in the methods a dynamic online planner for autonomous or at least semi-autonomous vehicles may be generated, which, based on the recognized current map segment configuration and subject population, analyzes the possible scenarios online, and plans, pre-controls, or controls the behavior of the vehicle. Such a behavior planner or trajectory planner or maneuver planner may be used independently or together with further behavior planners, trajectory planners, or maneuver planners. When such a behavior planner or trajectory planner is used, the provided safety monitor may be provided closely linked with same, so that during control of the vehicle, the safety monitor recognizes early when the vehicle is operating outside the context provided in the development, in order to be able to proactively initiate suitable measures such as alternative responses.

In one possible variant of the present invention, the measure that is taken in particular by a safety monitor may include a check of the behavior planning or trajectory planning, and optionally an intervention into the behavior planning or trajectory planning if this appears necessary based on the check.

In a further possible variant of the present invention, the behavior planning or trajectory planning may take place as a function of the measure that is taken.

The methods may in particular be carried out online on a computer in the vehicle. For this purpose, a computer program is executed which is configured for carrying out the method and is stored in a machine-readable memory for processing.

The methods in accordance with example embodiments of the present invention may allow a structured derivation of desired behavior of a vehicle system or vehicle. In particular, guaranteeing completeness of the scenarios under consideration with regard to known influencing factors is also possible, preferably via a structured definition of equivalence classes based on known features and effects that occur in traffic. An automated redundancy and gap analysis is also possible, as well as a definition and ascertainment of levels of coverage.

In addition, the methods in accordance with an example embodiment of the present invention may provide a significant reduction in the description complexity of the scenarios that are to be protected, and the scope of the description may be reduced exponentially.

The methods in accordance with example embodiment of the present invention are very flexible and modular. Important influencing factors may be added, and existing scenarios may be maintained, but also automatically expanded by the new influencing factors.

The model-based procedure allows simple transferability to other countries. Due to an abstraction of traffic situations into logical zones, a modular description of the individual effects which contribute to a complex behavior decision is made possible (for example, consideration of a crosswalk separately from the intersection at which it is situated). This results in a high level of reduction in complexity and a high degree of reusability.

A structured, largely automated derivation of a complete scenario consideration for autonomous vehicles (automobiles, robots, autonomous forklifts, etc.) based on generic traffic segments and subject populations is achieved which enables protection of the HAD systems of the vehicle, in particular for behavior and trajectory planning.

Specific embodiments of the present invention are explained in greater detail below with reference to the figures.

BRIEF DESCRIPTION OF THE DRAWINGS

FIG. 3 shows two zone graphs derived from zones of a digital road map.

FIG. 4 shows a first behavior model for a behavior of a vehicle.

FIG. 18 shows an example of a traffic situation in which the behavior of a pedestrian takes the vehicle out of an intended operating range.

DETAILED DESCRIPTION OF EXAMPLE EMBODIMENTS

The described methods for controlling a vehicle in accordance with example embodiment of the present invention make it possible in particular, based on zones derived from a digital map and sequences of traffic situations, to establish a violation of assumptions and requirements defined during the development of the vehicle.

The methods are described below, based on an at least semi-autonomous or highly-automated vehicle or a vehicle system of the vehicle. A vehicle system may in particular be a subsystem of the vehicle. In particularly preferred embodiments, the vehicle or vehicle system includes at least one computer program that prompts actuator interventions as a function of sensor values, in particular by prompting the carrying out of behavior planning for the vehicle as a function of the sensor values, and prompting actuator interventions for implementing same. Thus, for example, surroundings information may be detected by sensors of the vehicle, and steering, acceleration, or braking may be prompted as a function of the detected sensor values. The methods may be used in particular for fully automated vehicles or semi-automated vehicles, for example vehicles including driver assistance systems. Such vehicles may encompass automobiles, robots, trains, ships, or aircraft.

Possible vehicle systems of such a vehicle may include a perception layer or sensor layer, a layer for situation analysis and prediction, a layer for selecting a desired vehicle behavior from possible behavior patterns, and/or a layer for controlling actuators for achieving the desired vehicle behavior.

In the behavior planning, trajectory planning, or maneuver planning for such a vehicle system or its control, it may be taken into account when or how this vehicle system meets certain requirements, in particular safety requirements, in particular whether correct or safe vehicle behavior is actually prompted, based on certain situation analyses or predictions.

Figure 1:
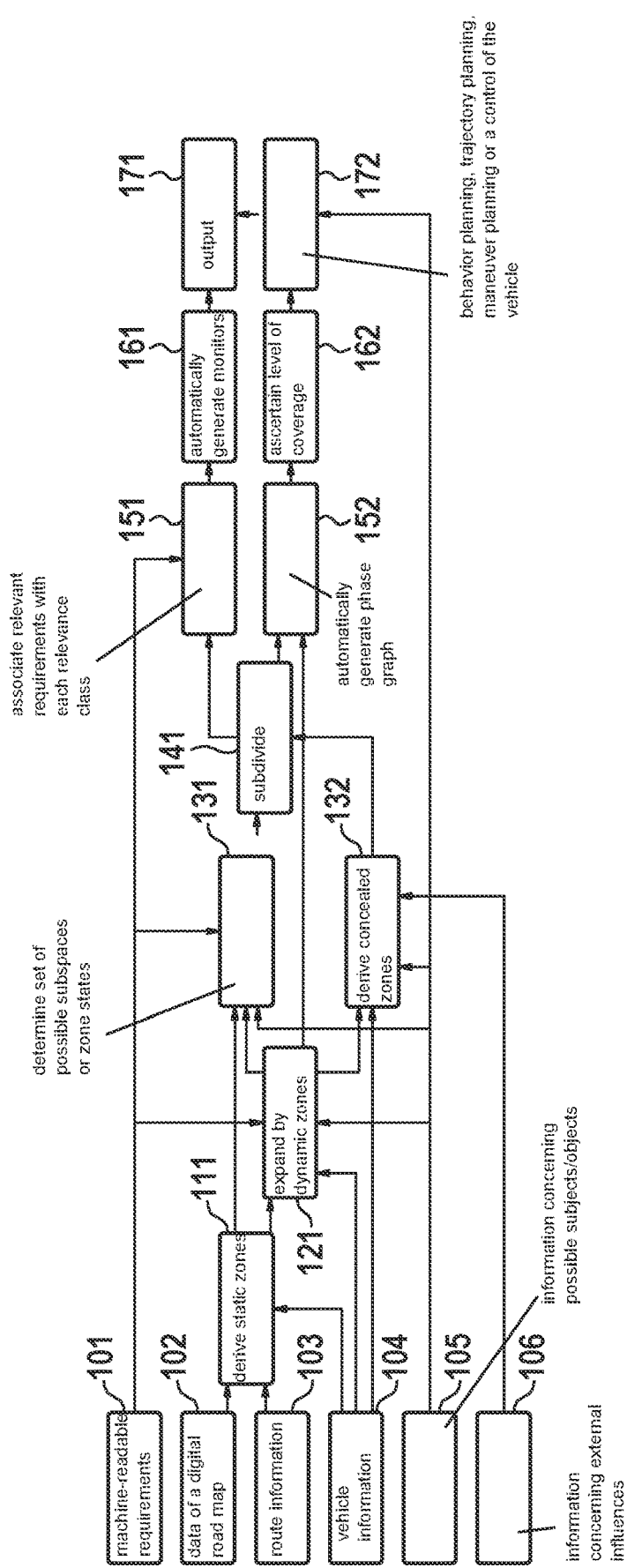
FIG. 1 shows an example of the sequence of a method for controlling a vehicle, in accordance with the present invention.

FIG. 1 shows an example of the sequence of a method for controlling a vehicle system.

The following possible input variables 101 through 106 are shown in the first column of the diagram:

machine-readable requirements 101 for the system from various sources, for example derived from the traffic regulation (for example, distances between vehicles, etc.), safety regulations, or vehicle (system) specifications.

data of a digital road map 102, in particular with a listing of the positions of crosswalks, signs, traffic lights, lanes, intersections, traffic circles, etc., for example in the OpenDrive format or ascertained from a current surroundings recognition or transmitted from a navigation system of the vehicle;

route information 103, for example possible routes on a road map element in question or a route that is selected or predicted for the vehicle, vehicle information 104, for example possible vehicle states or a current vehicle state, in particular in each case including certain vehicle properties such as weight, length, height etc., information concerning possible subjects and/or objects 105, in particular road users such as vehicles (bicycles, passenger automobiles, motorcycles, etc.) or pedestrians, preferably including behavior models or objects that may interfere with an intended behavior of a vehicle that includes the vehicle system; population with the possible subjects and/or objects may take place as a function of a recognition of the vehicle surroundings, information concerning external influences 106 such as weather data.

Method steps 111, 121, 131, 132, 141, 151, 152, 161, 162, 171, and 172 are shown in the further columns of the diagram in FIG. 1.

Static zones for the digital map are derived in step 111 based on certain input variables, in particular as a function of digital map 102, route information 103, and vehicle information 104, for example the vehicle length. The static zones may be automatically computed from such information. The logical zones thus computed are in particular fixed, and may be mapped onto the corresponding physical elements of the map (i.e., the roads or lanes, the pedestrian walkways, etc.). The static zones may be combined to form a static zone graph.

Static zones are in particular zones, such as a given crosswalk or an intersection area, having a size that is independent of the speed of the vehicle in question. They may be automatically derived from the map.

An expansion by dynamic zones takes place in step 121; in particular, the static zone graph may be expanded by the dynamic zones to form a dynamic zone graph. Dynamic zones are preferably automatically computed based on models of the individual subjects, on the basis of requirements for allowable maneuvers of the vehicle and the vehicle information. By the use of models, this computation is advantageously automatically expanded to other road users to be taken into account, and is applicable to arbitrary types of roads (urban, expressway, etc.). The models, such as behavior models in particular, are in particular used to compute other road users, coming from which areas (zones), that must still be taken into account for a (possible) subsequent decision of the vehicle in question.

Dynamic zones are in particular zones having a speed-dependent size, for example the zone in front of a traffic light, in which the vehicle in question can just stop, or just can no longer stop, in front of the stop line with comfortable deceleration when the traffic light changes to "yellow." The dynamic zones are in particular a function of position, speed, and behavior models of the vehicle in question and/or of the positions, speeds, and behavior models of other subjects or road users. The behavior models in particular are (physical)

models for the particular objects. The dynamic zones may optionally also be a function of external influences such as the weather, for example due to an increased braking distance on slick ice.

There are zones whose location is relative to the position of the vehicle in question, such as the necessary open space ahead of the vehicle in question, and zones that have an absolute location, such as a given intersection zone in an actual map.

The zones in the zone graphs, and thus the zone graphs, represent abstractions of the particular situations in such a way that they are independent of specific structures of the digital map such as curve radii or angles of an intersection. These logical zones may be mapped onto the map as physical zones.

Concealed zones may be derived in a step 132. Concealed zones thus refer in particular to defined zones for a sensor system such as cameras, radar, etc., of the vehicle in question, which are completely or partially concealed. The ascertainment of which of the previously identified or derived zones are concealed zones may be derived in particular as a function of pieces of information of the digital map, of pieces of information concerning external influences (visibility, snow on the road, and/or the vehicle position). In particular, a comparison between zones that are (potentially) relevant for a scenario and the zones that are concealed in a scenario may take place in order to deduce a weakness of the vehicle system therefrom.

A concealment may result, for example, from external influences (for example, weather such as fog), roadside structures, other road users, etc.

A set of possible subspaces or zone states may be determined for each identified or derived zone in a step 131. The states "free," "occupied," and "at risk" are preferably defined as possible zone states. "Occupied" means in particular that a subject other than the vehicle in question, for example a road user, is situated at that location. "At risk" means in particular that some other subject, in particular a road user, based on its associated model potentially occupies the zone when the vehicle in question would like to pass through it. "Free" means in particular that the zone is not occupied and not at risk. The set of possible subspaces or zone states is preferably determined via a Zwicky box, which combines all relevant properties of the subjects that are present and all characteristics that are allowable for the properties, under which the zone is either free or occupied or at risk.

The space of the possible scenarios may now be systematically and completely analyzed, and completely and consistently subdivided into equivalence classes, via a behavior analysis. An equivalence class includes all situations in which the vehicle in question should or does have the same behavior.

For this purpose, the complete set of possible sequences or scenarios for the existing combination of the digital map, the vehicle in question, the subject behavior, and further input variables is ascertained from the determined dynamic zone graphs, and using the ascertained subspaces, is subdivided into equivalence classes, in a step 141. Each combination of influencing factors under which the vehicle in question in a certain zone should or does show a certain behavior is classified into the same equivalence class.

The relevant requirements are associated with each equivalence class in a step 151. For this purpose, the requirement is present in machine-readable form, and may be present, for example, as "allowed behavior," "nonallowed behavior," or "obligatory behavior." Obligatory damage-reducing behaviors may also be stored as requirements.

One or multiple monitors are automatically generated for each equivalence class in a step 161. The monitors include a safety monitor. The safety monitor ascertains, as a function of sensor data and/or current driving data of the vehicle, whether a current or predicted traffic situation is outside the possible sequences or corresponds to a possible sequence that is determined to be outside an intended operating range. If the current or predicted traffic situation is outside the possible sequences or corresponds to the possible sequence outside the intended operating range, the computer-implemented safety monitor in the vehicle may take a measure, as a function of which the vehicle is controlled. Further monitors may monitor or predict whether the vehicle in question is in the corresponding equivalence class, and whether the vehicle system meets the requirements associated with this equivalence class, i.e., in particular behaves corresponding to the requirement specifications or test specifications.

The generation of the monitors may take place in a targeted manner for monitoring the operational design domain (ODD), i.e., the intended operating range, i.e., for the class of scenarios or requirements for which the vehicle system is to be designed or tested.

The monitors may run with different, in particular slower, clocking than possible controllers in the vehicle system in question.

A phase graph may be automatically generated, based on the zone graph and the defined equivalence classes, in a step 152.

The phase graph enables the ascertainment in step 162 of a level of coverage for the ascertained possible sequences via a systematic detection of all possible behavior patterns for the vehicle in question and the comparison to the variants taken into consideration by same.

A certain pattern in the phase graph corresponds to a sequence of certain zones in a certain order, each having a defined equivalence class for each zone. By using a level of coverage (path coverage, for example), it may automatically be ensured that a certain, in particular complete, coverage of the possible sequences is met.

Behavior planning, trajectory planning, or maneuver planning for the vehicle or a control of the vehicle may take place in a step 172, based on the possible sequences that are considered and analyzed for the meeting of requirements.

The populations of the individual zones including specific subjects, and the determination of their starting points and starting states (i.e., speeds, etc.), may take place based on recognition of the vehicle surroundings.

In addition, continuous parameters (so-called continuous subspaces within the equivalence classes), which may be varied, are automatically derived from the information contained in the equivalence classes concerning the vehicle and the other subjects, in particular road users. Examples of such continuous parameters are friction coefficients, speeds, or curve radii.

The output in step 171 is preferably the result of behavior planning, trajectory planning, or maneuver planning, or control commands for the vehicle or for actuators of the vehicle.

The methods may include deriving critical visual ranges of a perception of the vehicle system from the physical zones, and comparing them to the actual perception of the vehicle system. For this purpose, in particular it may be ascertained whether or not examining a certain zone is necessary for meeting requirements for the vehicle system. In turn, requirements for a sensor architecture of the vehicle system or of the vehicle may be derived therefrom. In addition, distance-dependent metrics may be used; i.e., the dependency of a perception on the distance of the vehicle in question from a certain zone to be examined is taken into account.

Further input variables may be taken into account for assessing a perception of the vehicle. Such input variables may include perception metrics, in particular standard metrics, for assessing a perception quality.

The control of the vehicle may then take place also as a function of the analysis of the perception that occurs.

Figure 2:
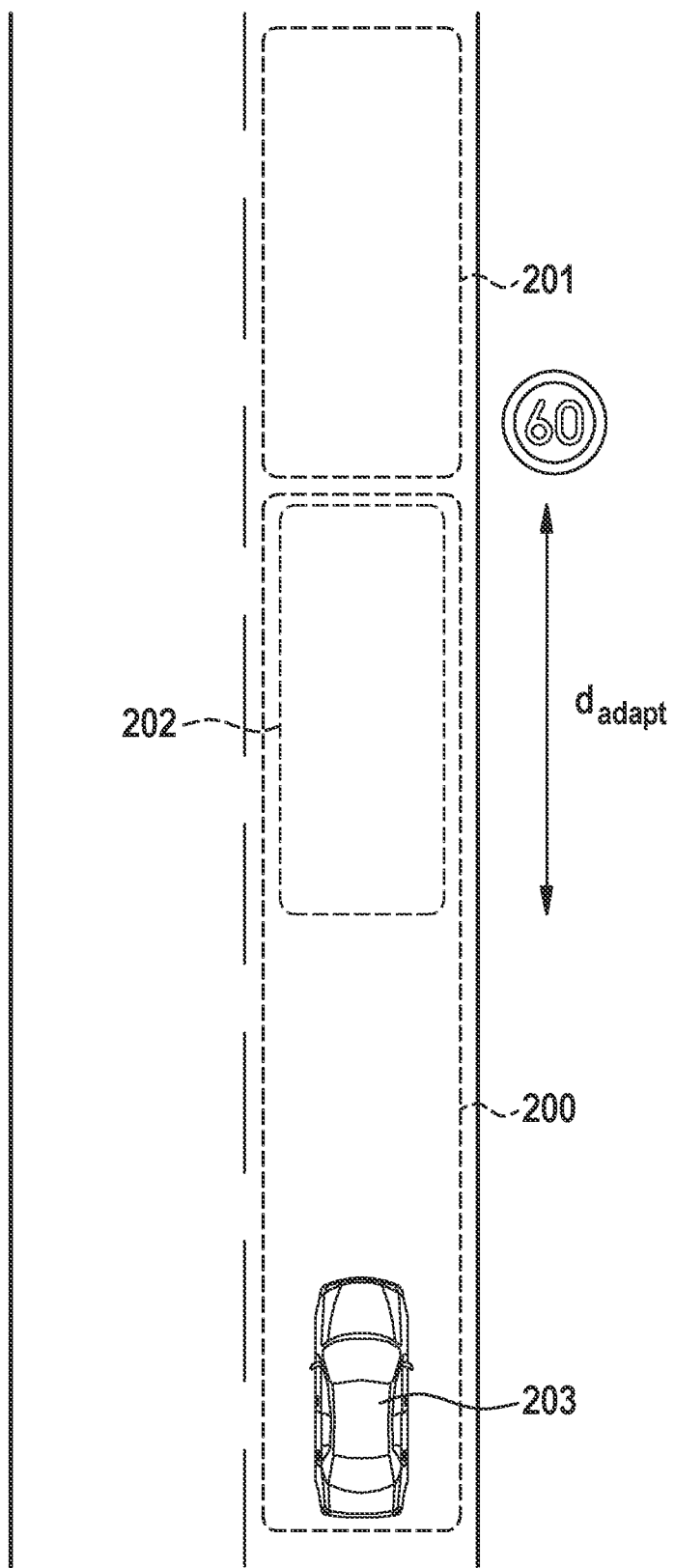
FIG. 2 shows a first example of a detail from a digital road map, with depicted zones.

FIG. 2 schematically shows a simple road segment of a digital road map including two lanes and vehicle 203 in question. A traffic sign with a speed limit of 60 is also illustrated. In the lane in question, a static zone 201, beginning at which the new speed specification applies, as well as a static zone 200 in which the new speed specification does not yet apply, result due to the traffic sign with a speed limit. In addition, a dynamic zone 202 may be derived, as a function of the speed of vehicle 203 in question, in which vehicle 203 is still able to sufficiently decelerate in front of the traffic sign to the allowed speed ($d_{adapt}$) in particular with safe and preferably comfortable deceleration.

FIG. 3 shows two zone graphs derived for the scenario shown in FIG. 2. The zone graphs correspond to a linkage of logical zones that are derived from the physical zones of the map. Two possible zone graphs result as a function of the speed of the vehicle. The first zone graph, in addition to static zones 301 and 300, contains dynamic zone 302 explained for FIG. 2, which corresponds to a still sufficient deceleration distance. The second zone graph does not contain this dynamic zone which is a function of the vehicle speed, for example because the vehicle is already traveling slowly enough.

Sequences, which are a function of the following variables and their possible characteristics, for example, now result as a behavior space:
current maximum speed
   low target speed beginning at traffic sign
   same target speed beginning at traffic sign
   high target speed beginning at traffic sign
current speed
   low current target speed
   same current target speed
   high current target speed
distance of vehicle from traffic sign
   less than adaptation distance
   same as adaptation distance
   greater than adaptation distance The adaptation distance refers to the deceleration distance described above, in which in particular a safe and comfortable deceleration is still possible.

All possible scenarios may be systematically considered or predicted based on such a listing. The complexity of the scenarios is greatly reduced by the abstraction into logical zones, by the selection of relevant parameters, and the subdivision into relevant parameter ranges. By selecting the parameters and parameter ranges in mutually exclusive alternatives, scenarios that are independent of one another may be determined which completely cover the space of possible scenarios.

FIG. 4 shows a diagram for a parametric behavior model of the vehicle in question, which belongs to the first zone graph from FIG. 3. A target speed $v_{target}$ is plotted as a function of a distance s. The static zones from FIG. 3, 400 or ds and 401 or nls in the present case, and the dynamic zone from FIG. 3, 402 in the present case, are likewise shown. Maximum speed of the current zone $v_{max}(cls)$ and thus the current speed of the vehicle in question are above maximum allowable speed $v_{max}(nls)$ beginning at the traffic sign, and a deceleration $d_{decel}(AV)$ from current speed $v_{max}(cls)$ to the then maximum allowable speed $v_{max}(nls)$ correspondingly takes place within dynamic zone 402 or $d_{adapt}$.

Figure 5:
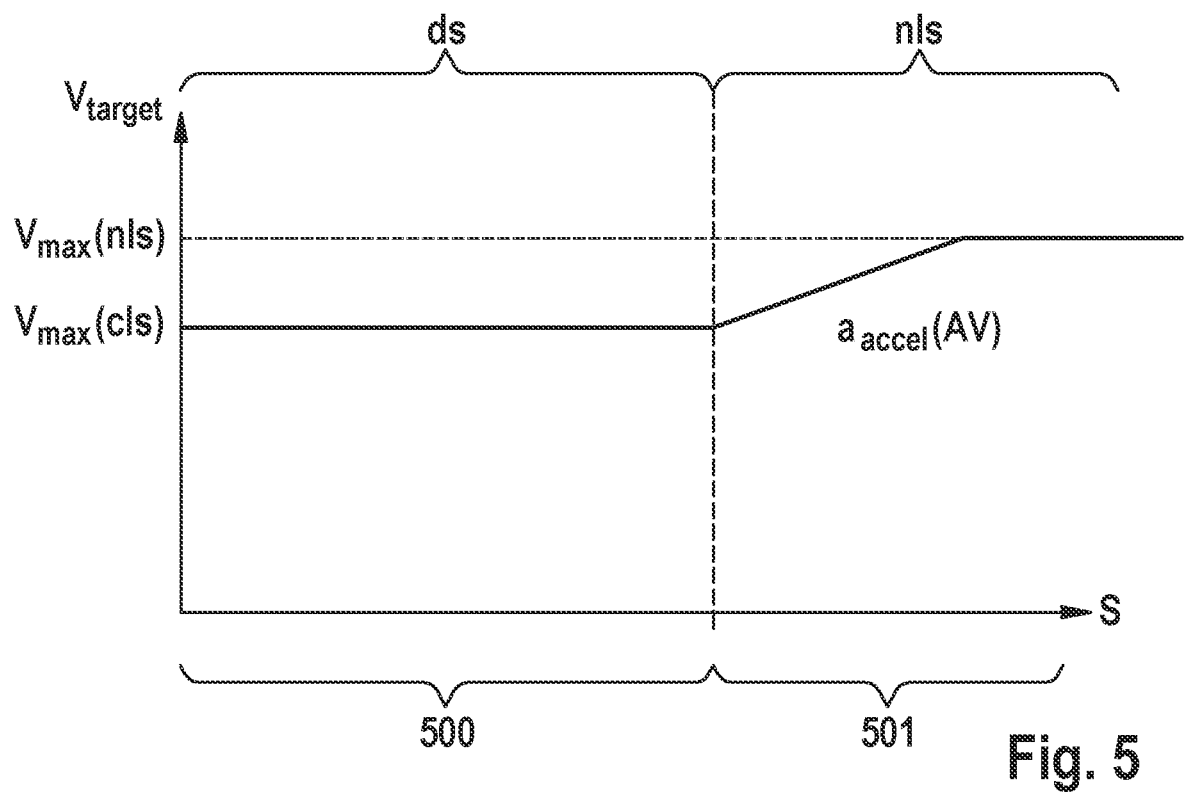
FIG. 5 shows a second behavior model for a behavior of a vehicle.

FIG. 5 shows a diagram for a parametric behavior model of the vehicle in question, which belongs to the second zone graph from FIG. 3. A target speed $v_{target}$ is plotted as a function of a distance s. The static zones from FIG. 3, in the present case as 500 or ds and 501 or nls, are likewise shown. Maximum speed of the current zone $v_{max}(cls)$ and thus the current speed of the vehicle in question are below maximum allowable speed $v_{max}(nls)$ beginning at the traffic sign, and an acceleration $a_{accel}(AV)$ from current speed $v_{max}(cls)$ to the then maximum allowable speed $v_{max}(nls)$ correspondingly takes place within static zone 500 or ds.

Such behavior models preferably take into account traffic regulations, vehicle dynamics limitations, system limitations, and comfort limitations. The specific form of the models is largely irrelevant. The behavior analysis that takes place based on the zone graphs, including the concepts used there such as certain distances, speeds, accelerations, and comfort variables such as a smooth ride, is preferably to be carried out in such a way that it remains stable within a wide range, even if the model parameters of the behavior models change. The behavior analysis may thus be applied, largely independently of the specific parameters of the behavior models, and thus, of many different situations. This requires the suitable selection of the abstractions in the behavior analysis.

The generic behavior for "travel in an empty lane with static limitations," illustrated in FIGS. 2 through 5, is hierarchically subordinate to any behavior in a more specific situation, for example "turning right in an intersection with a traffic light and crosswalks."

The corresponding behavior spaces preferably have a hierarchical structure. The basic behavior for each road segment is in particular given by the longitudinal behavior "travel in an empty lane with static limitations." In the present case, "empty" means empty of other subjects or road users. Static limitations (static constraints) may be speed limits, lane narrowings, curves, etc., that result in a different maximum speed for the next road segment. Due to the difference between the future limitation and the current speed, the vehicle in question may possibly have to make an appropriate adjustment in speed.

Figure 6:
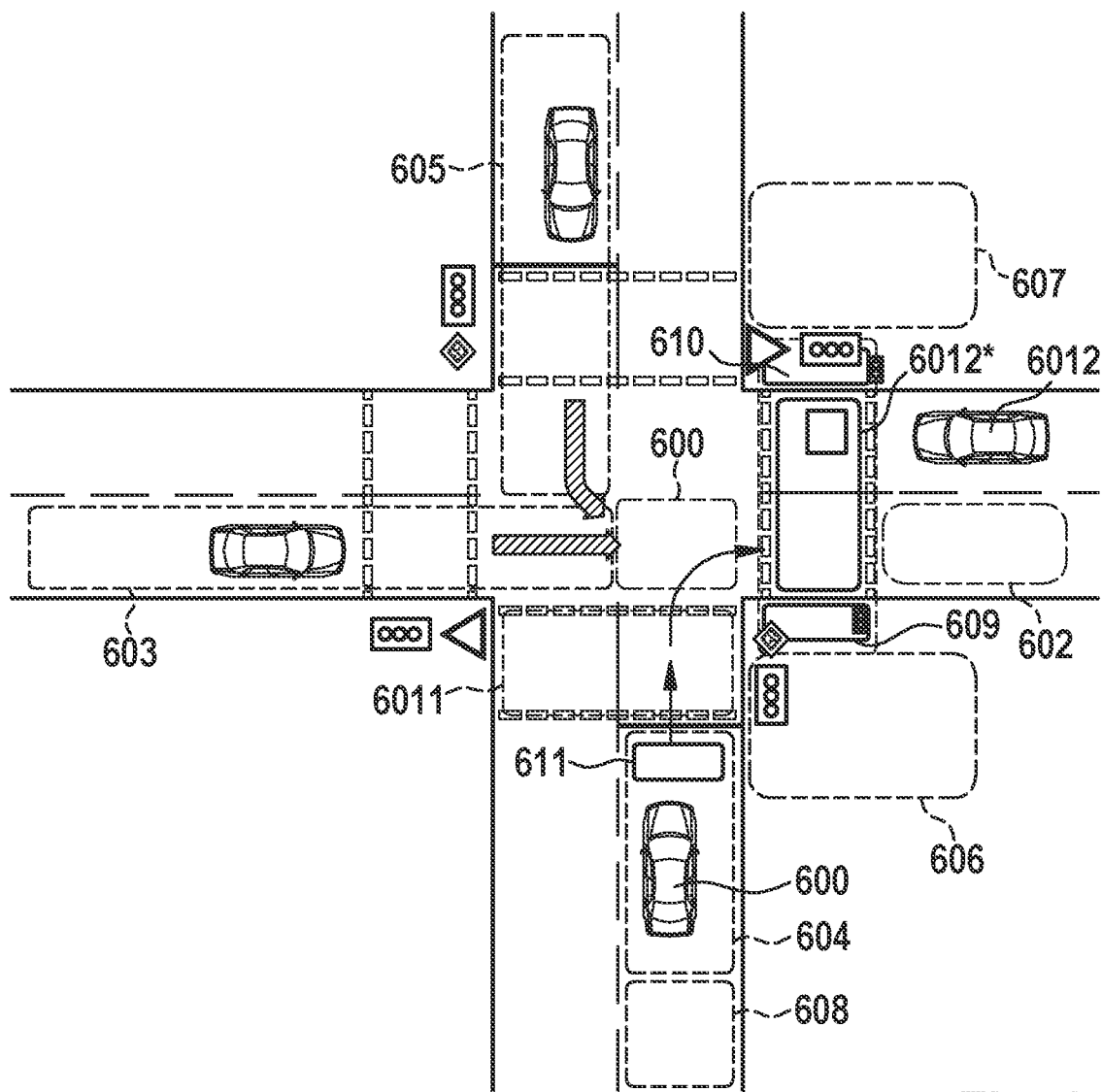
FIG. 6 shows a second example of a detail from a digital road map, with depicted zones.

FIG. 6 illustrates a schematic diagram of a four-way intersection with traffic lights, traffic signs, crosswalks 6011 and 6012, vehicle in question 600, and further road users (further vehicles, for example 60, and pedestrians 6), in which vehicle in question 600 is to turn right.

Figure 7:
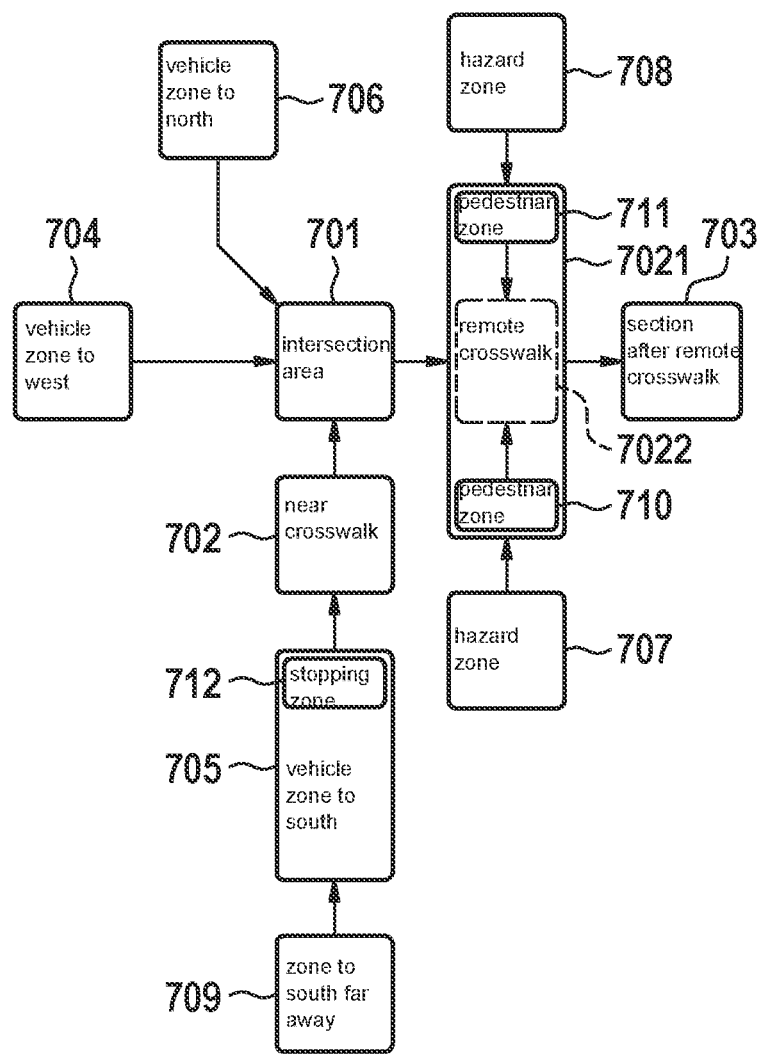
FIG. 7 shows a zone graph derived from zones of a digital road map.
Figure 8:
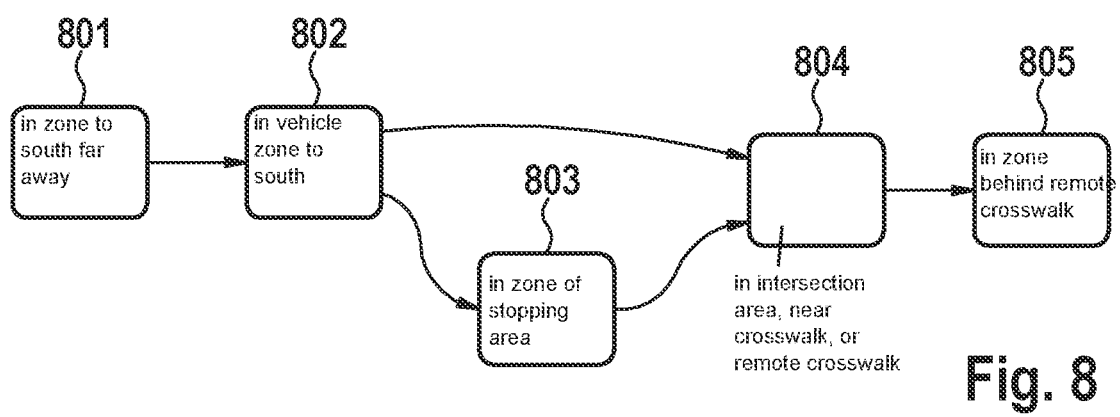
FIG. 8 shows a first phase graph derived from a zone graph.

Relevant zones 600, 602, 603, 604, 605, 606, 607, 608, 609, 610, 611 for the behavior analysis shown in subsequent FIGS. 7 and 8 are also depicted.

This results in the static zones:
intersection area 600
near crosswalk 6011
remote crosswalk per se 601 (on the street)
remote crosswalk in the broader sense 6012 (including waiting area, for example)
section 602 after the remote crosswalk
This also results in the dynamic zones:
vehicle zone of vehicle to the west 603
vehicle zone of vehicle to the south 604
vehicle zone of vehicle to the north 605 zones 609, 610 for pedestrians on both sides of the remote crosswalk zone to the south 608, far away from the intersection (zone behind the vehicle in question in FIG. 6)

stopping zone 611 in front of the near crosswalk hazard zones 606, 607 for pedestrians, who could step into the remote crosswalk, on both sides of the remote crosswalk For example, only the specifics of "right turn in a four-way intersection with crosswalks" are considered in the associated behavior analysis. Thus, it is then presumed that the behavior of "right turn on a green light, without pedestrians and without further other road users," which corresponds to "travel in an empty lane with static limitations," is already controlled, and therefore is no longer explicitly described. The static limitations are essentially given here by the generally allowed maximum speed, the lane widths, lane slopes (longitudinal and transverse), and the curve radius of the necessary turn trajectory.

FIG. 7 depicts a corresponding zone graph for the zones shown in FIG. 6.

Static Zones:
  intersection area 701
  near crosswalk 702
  remote crosswalk per se 7022 (on the street)
  remote crosswalk in the broader sense 7021 (including waiting area, for example)
  section 703 after the remote crosswalk Dynamic Zones:
  vehicle zone of vehicle to the west 704
  vehicle zone of vehicle to the south 705
  vehicle zone of vehicle to the north 706
  zones 710, 711 for pedestrians on both sides of the remote crosswalk
  zone to the south 709, far away from the intersection
  stopping zone 712 in front of the near crosswalk
  hazard zones 707, 708 for pedestrians, who could step into the remote crosswalk, on both sides of the remote crosswalk FIG. 8 depicts a phase graph for the scenario from FIGS. 6 and 7. The vehicle in question is initially in phase 801 in the zone (in FIG. 6, the zone to the south, far away from the intersection), in phase 802 is in the vehicle zone of the vehicle to the south (in FIG. 6, the zone of the vehicle in question), in phase 803 is in the zone of the stopping area in front of the near crosswalk, in phase 804 is in one of the zones intersection area, near crosswalk, or remote crosswalk, and in phase 805 is in the zone behind the remote crosswalk. The possible transitions are characterized by arrows. Thus, depending on the situation, the vehicle may or may not come to a stop in the stopping area in front of the near crosswalk; i.e., a phase transition from phase 802 to phase 804 may take place directly or via phase 803.

Parameter combinations for parameters such as speed, acceleration, and position in the lane of the vehicle in question, which result in an identical setpoint behavior of the vehicle in question, are preferably defined as equivalence classes. For each equivalence class, monitors are generatable which check the observed and predicted behavior of the vehicle or vehicle system in question as to whether the specifications of the equivalence classes are satisfied.

A projection of the equivalence classes onto the zones for an analyzed road segment in question, having a potential subject population and a predefined intention (mission) of the vehicle in question, provides the phases of the movement of the vehicle in question through the zones of the road segment, taking the behavior of the subject population in question into account.

A phase is formed by the subset of the equivalence classes of the behavior analysis of the road segment which may occur in the zone in question. Depending on the size of the zone, the vehicle in question may also change back and forth within the zone, between the equivalence classes of the phase; for example, in a large zone with stop-and-go traffic, the vehicle may make multiple changes between starting, traveling, stopping, and waiting.

The succession of the phases when passing through the road segment forms a phase graph. The vehicle in question is always in one phase, and in each phase is in exactly one of the equivalence classes that form this phase.

More complex phase graphs may dynamically arise, for example when the intended route of the vehicle in question is blocked for a long period of time, for example due to an accident. A new route may then be computed, which typically results in a locally different intention of the vehicle in question, and thus results in new phases, zones, etc. This may be controlled by the vehicle in question if the necessary maneuvers (for example, turning around or backing up in the lane and turning as soon as possible) are controlled, and the road segments to be expected on the alternative route are likewise controlled by the vehicle in question.

The phases provide the basis of the compositionality for the behavior of the vehicle in question. If each analysis of a road segment includes an input zone and an output zone, and thus an input phase and an output phase, compositionality on the topological level of the road segments and on the behavior level of the phases is possible. In particular, the input zone of the subsequent segment contains the output zone of the preceding segment.

The output zone of a road segment may preferably completely accommodate the vehicle in question, but should not be much larger, so that it is possible to leave the particular segment under minimal conditions.

The input zone of a road segment is typically a zone that is remote from the vehicle in question with regard to the relevant portion of the road segment (intersection, traffic circle, etc.).

For certain generic road segments (simple road sections, simple intersections, simple traffic circle, simple parking facility, etc.), analyses are preferably carried out and stored as models in an appropriate model library. Relatively few such generic models are sufficient for covering a large proportion of all possible or actually occurring road segments. With a selection of the relevant properties of such generic road segments, it is thus possible to create a small, configurable, and parameterizable model library, on the basis of which more complex road maps may be easily computed. Thus, for example, different types of T intersections may be generated from the generic model of a four-way intersection by omitting one intersection branch. The angles between the intersection branches, the lane widths, the number of lanes, or the provision of yield signs and traffic lights may in particular be parameters in the models.

Figure 9:
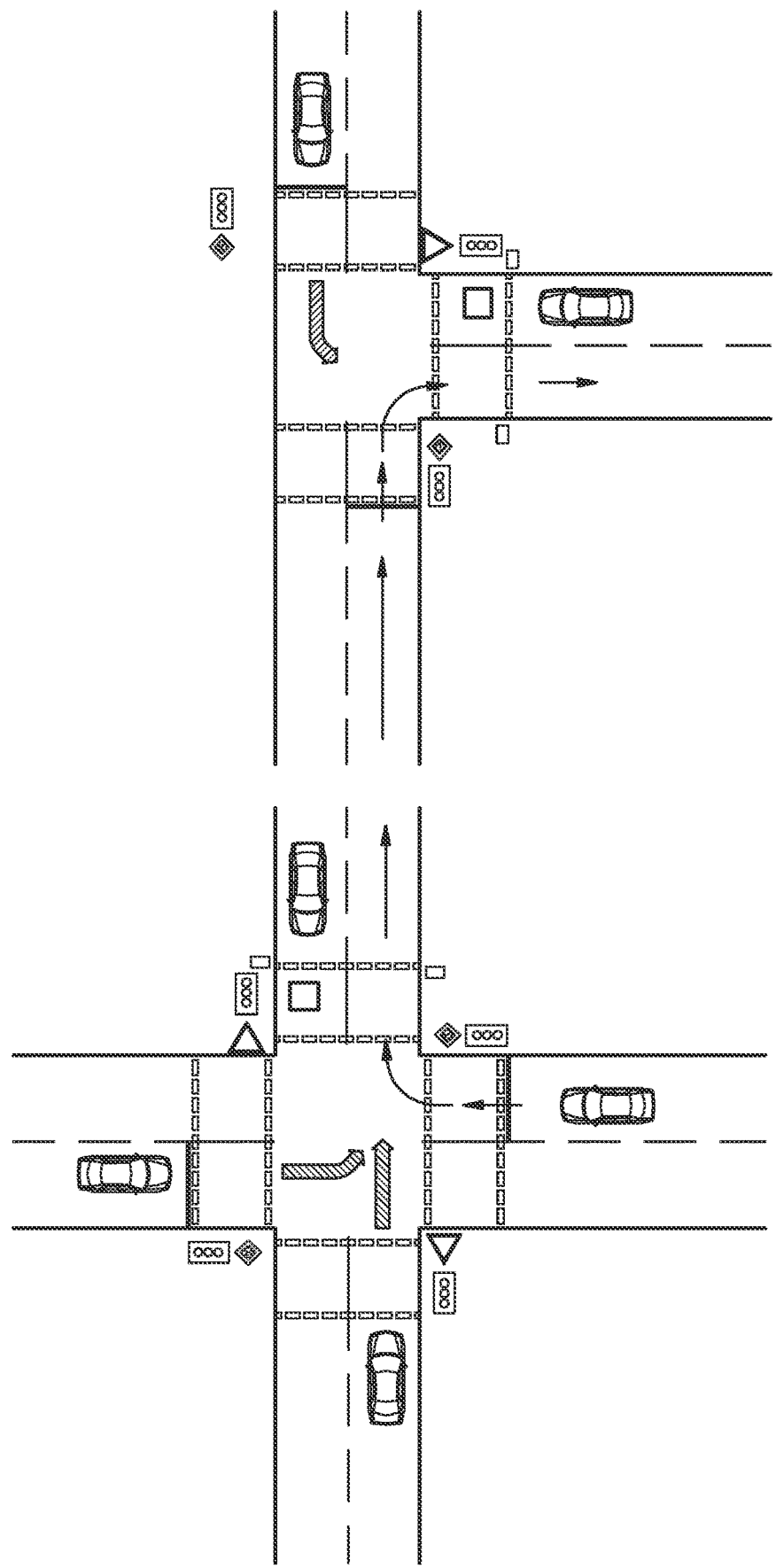
FIG. 9 shows a third example of a detail from a digital road map, with depicted zones.

FIG. 9 shows two road map segments in the form of road diagrams that may be combined. The road map segments include:
  the vehicle in question, starting on the lower left side, whose intended maneuver is characterized by a sequence of thin arrows and leads the vehicle to the lower right side,
  further road users (vehicles with intended maneuvers are characterized by thick arrows, pedestrians as boxes), traffic lights and traffic signs,
crosswalks.

Figure 10:
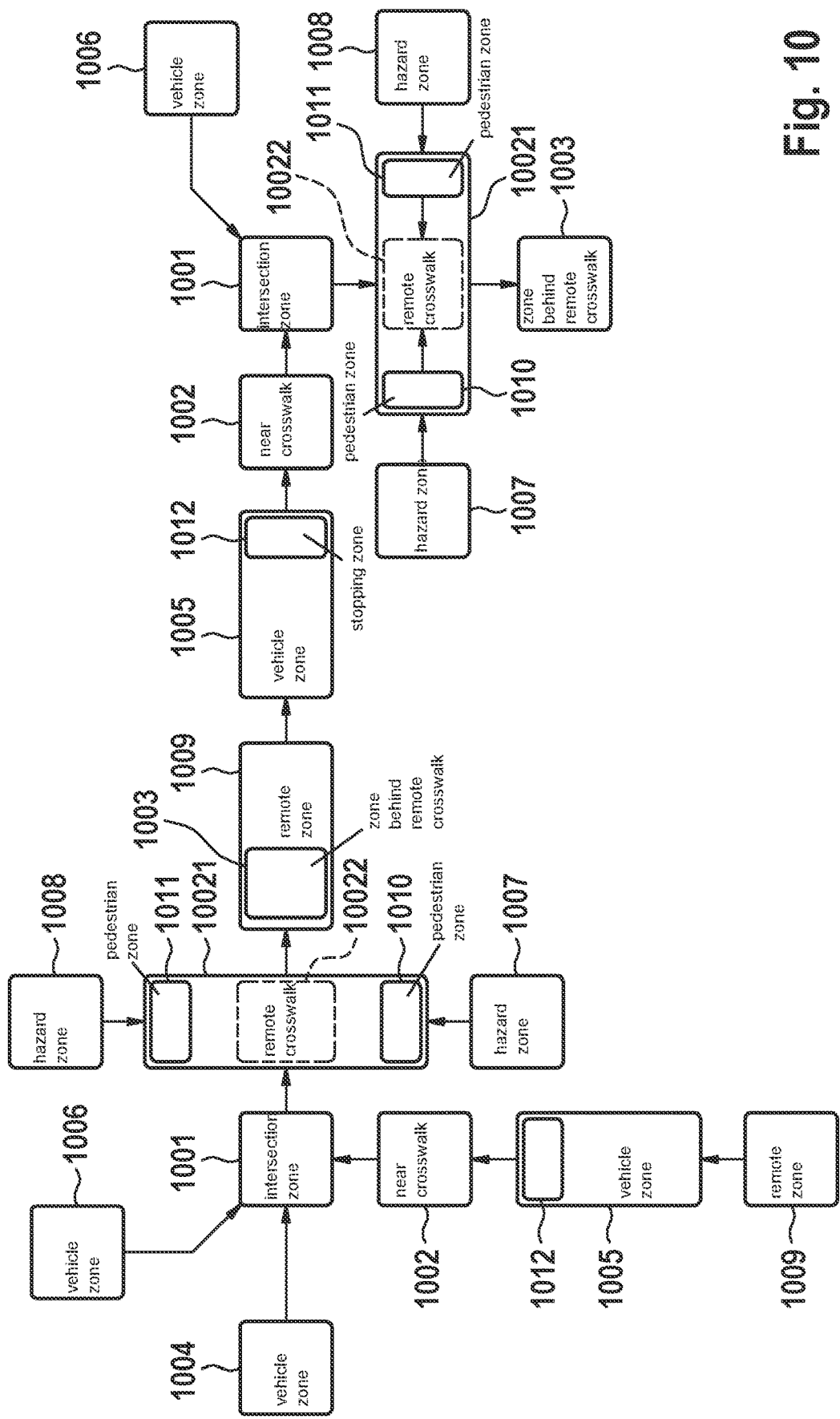
FIG. 10 shows a second zone graph derived from zones of a digital road map.

FIG. 10 shows a zone graph for the road map segments in FIG. 9. The zones on the left side and the zones on the right side in FIG. 10 have been ascertained for the left and right road map segment, respectively, in FIG. 9. Identical zones are denoted by the same reference numerals:
intersection zone 1001,
remote zone 1009,
near crosswalk 1002,
remote crosswalk with associated zones for pedestrians and hazard zones for pedestrians (10021, 10022, 1010, 1011, 1007, 1008),
vehicle zones 1004, 1005, 1006,
stopping zones 1012,
zone 1003 behind the remote crosswalk.

Figure 11:
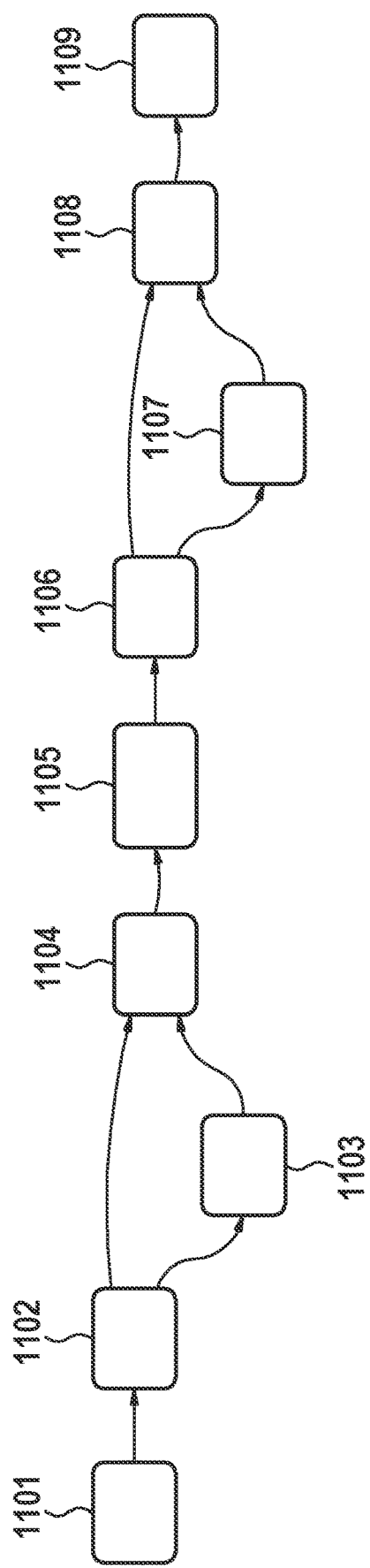
FIG. 11 shows a second phase graph derived from a zone graph.

FIG. 11 shows a phase graph for the zone graphs in FIG. 10. Phases 1101 through 1104 on the left side and phases 1106 through 1109 on the right side in FIG. 11 have been ascertained for the left and right portion, respectively, of the zone graph in FIG. 10. Phase 1105 between the two sections represents the transition, and corresponds to a transition between the zone graphs in FIG. 10 and between the map segments in FIG. 11.

If two or more road map segments have already been considered, for example stored in a model library, for a fairly complex road map scenario that is made up of the road map segments with transitions, it is sufficient if only the unknown transitions are considered once again. Aside from this, the analyses that have already taken place may be relied on.

By automatic abstraction of a given map into a logical zone graph for the maneuver that is possible on the map, exact information may be ascertained concerning which components of the map are already controlled in the analyses carried out using the method, and which components must still be additionally considered.

A structural compositionality and a behavior compositionality are achieved via the selected abstractions (zones, equivalence classes, phases). The structural compositionality allows the linkage of multiple base elements (a straight road and a curve, for example), based on zones. Via the behavior compositionality, by the definition of phases it is possible to obtain certainty that a consideration of individual elements in the analysis is sufficient for correct behavior on complex maps.

Figure 12:
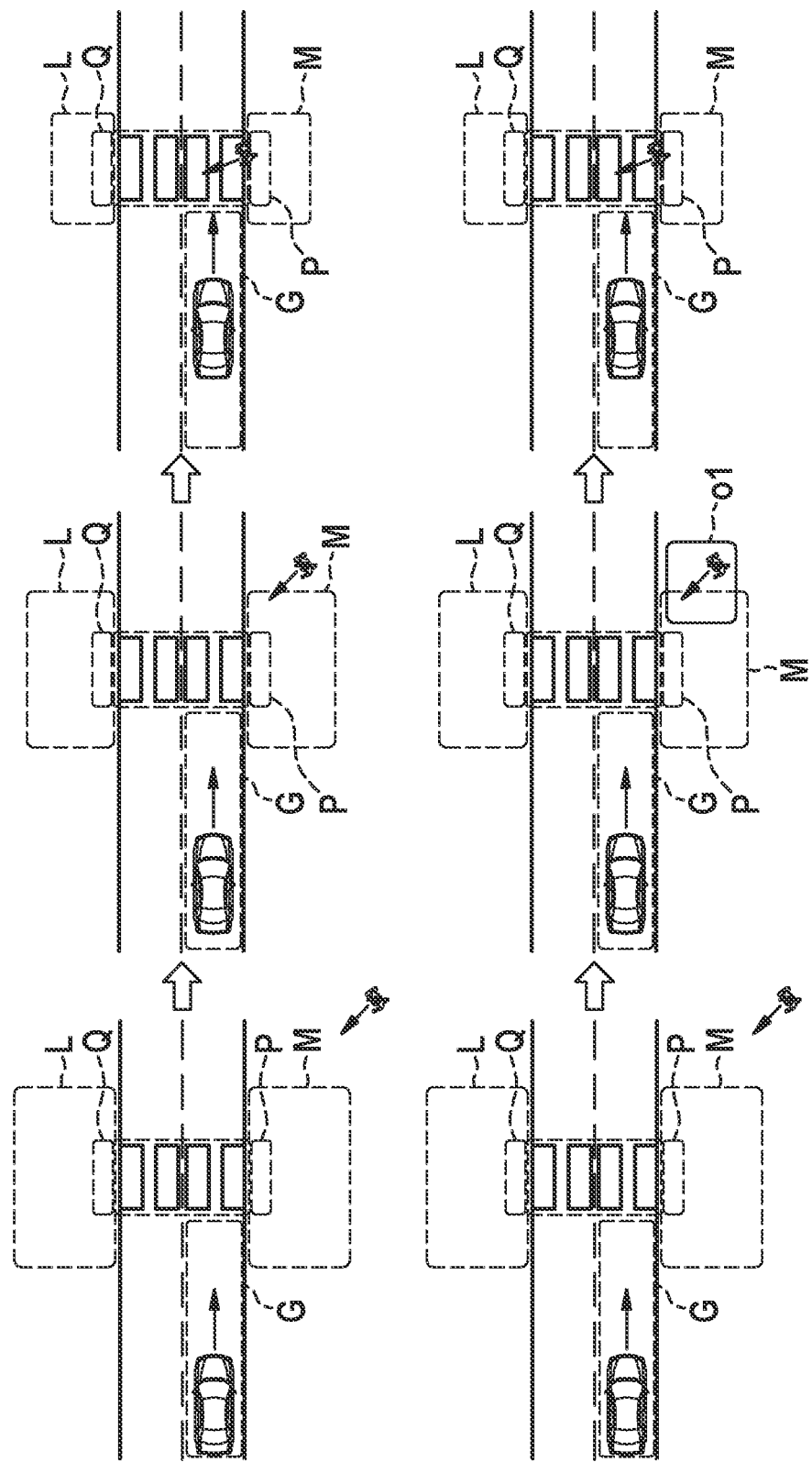
FIG. 12 shows an example of a traffic situation in which a pedestrian exhibits behavior outside an intended context.

FIG. 12 shows an example of a traffic situation in which a pedestrian is exhibiting behavior outside an intended context. All six settings involve a vehicle on a roadway, a pedestrian next to or at the edge of the roadway, and zones designated for the driving situation. A zone G involves an area of the roadway in front of a crosswalk. A zone M involves an area of a sidewalk next to the roadway at the level of the crosswalk. A zone P involves an area from zone M which directly adjoins the roadway and the beginning of the sidewalk. The zones on the other side of the roadway, corresponding to sidewalk zones P and M, are denoted as Q and L, respectively.

A scenario without application of one of the provided methods is shown in the three settings in the top row.

In the first setting, the vehicle approaches the pedestrian walkway in zone G, and the pedestrian is walking in the direction of zone M and the crosswalk, but is not situated in one of the designated zones which the vehicle may use for its control. Thus, the pedestrian is regarded as not (yet) relevant for the behavior or the decision-making of the vehicle. The size of zones L and M is a function of the (predicted) time required for the vehicle to traverse the crosswalk, and of the assumed maximum speed of pedestrians corresponding to the intended operating range (ODD) of the vehicle.

In the second setting, the vehicle further approaches the crosswalk, as the result of which the expected time for traversing the crosswalk is reduced, and therefore the size of zones L and M is reduced. The pedestrian likewise further approaches the crosswalk, but is still evaluated as not relevant, since the pedestrian is situated outside the designated zones, in particular zone M.

In the third setting, the vehicle has further approached the crosswalk, as the result of which the size of zone M is once again reduced. However, the vehicle has not yet reached the crosswalk. In contrast, the pedestrian has meanwhile traversed zones M and P and is situated at the beginning of the crosswalk, and thus becomes very relevant for the safe operation of the vehicle. Thus, a hazardous, undesirable situation has arisen in which the pedestrian is walking on the roadway directly in front of the vehicle.

A scenario with application of one of the provided methods is shown in the three settings in the bottom row, as the result of which the hazardous, undesirable situation may be anticipated.

The first setting corresponds to the first setting from the top row. While the vehicle and the pedestrian are approaching the crosswalk, the monitor may observe the traffic situation and determine whether the current or predicted traffic situation is outside the possible sequences derived for the designated zones.

For example, a distance of the detected pedestrian from zone M may be determined. If the distance decreases unexpectedly quickly, for example from the first setting to the second setting, a deviation from the expected traffic situations is recognized. As a countermeasure, in the present case in the second setting, for example, a new zone of is added around the pedestrian and is taken into account in the control of the vehicle. Similarly, in the third setting the vehicle may have already initiated a safe maneuver and safely stopped in front of the crosswalk while the pedestrian is walking on the roadway in front of the vehicle. The hazardous, undesirable situation is prevented.

Figure 13:
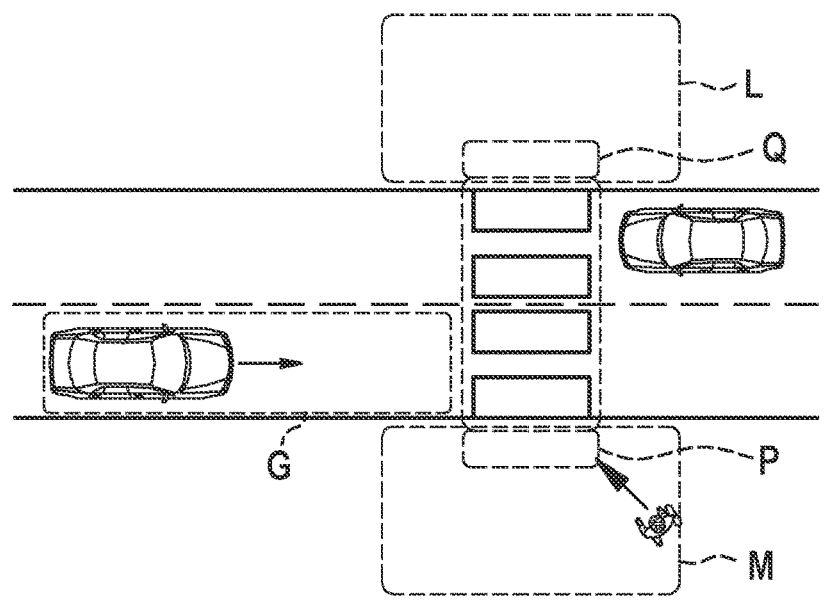
FIG. 13 shows an example of a traffic situation including two vehicles, a pedestrian, and a crosswalk.

FIG. 13 shows an example of a traffic situation including two vehicles that are moving in opposite directions in different lanes, a pedestrian, and a crosswalk. Zones G, L, M, P, Q correspond to the zones described for FIG. 12: travel zone G of the vehicle in question on the roadway, zones P and Q next to the roadway, directly in front of the crosswalk, in which it is expected that pedestrians will wait (briefly) before walking on the road, and zones L and M, which indicate that pedestrians situated therein can still reach the crosswalk before the vehicle has traversed it. As described for FIG. 12, the size of zones L and M is adapted based, among other factors, on models and assumptions about the possible movements (accelerations and speeds) of pedestrians and further road users. When a pedestrian does not behave corresponding to these models and assumptions, this may result in an unexpected situation.

A morphological analysis of the intended or desired behavior of the vehicle may now take place as a function of the zone graph from FIG. 13. In this simple scenario, two possible behaviors may be derived from the situation: "cross the crosswalk" or "stop in front of the crosswalk." The analysis allows for the possible behaviors or sequences to be complete and consistent, but only if the behavior of the road users is within the previously established limits and assumptions.

Figure 14:
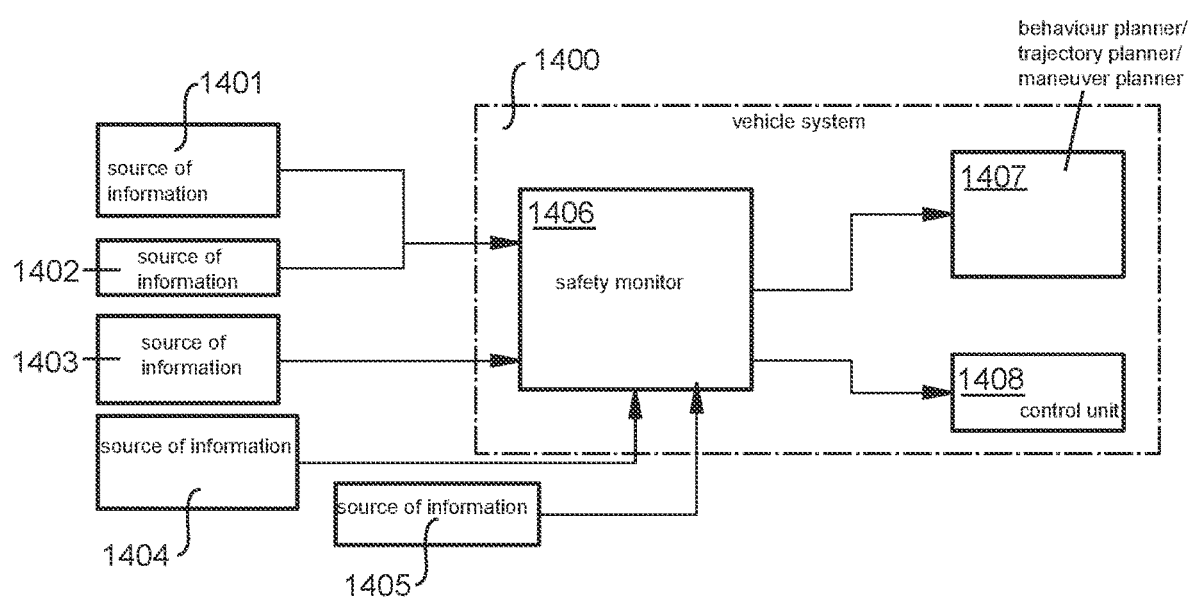
FIG. 14 shows an example of the sequence of a method for controlling a vehicle as a function of outputs of a safety monitor.

FIG. 14 shows an example of a sequence of a method for controlling a vehicle as a function of outputs of a safety monitor. A vehicle system 1400 includes a safety monitor 1406 which possesses the zones or zone graphs as well as the results of a morphological analysis via which possible sequences of traffic situations have been derived from particular zone graphs. These may also optionally be updated via software updates.

In addition, the monitor may access models for the vehicle (for example, with regard to acceleration, deceleration, steering options, etc.) as well as behavior models that describe the expected behavior of other road users such as pedestrians or other vehicles.

During operation of the vehicle, the safety monitor obtains further information from various sources 1401 through 1405, for example concerning a current state of the vehicle (for example, speed and current position on the digital map) and the detected vehicle surroundings, including further road users. This information may be derived from sensor data of the vehicle or received from the outside, in particular via a vehicle-to-vehicle communication or an infrastructure-to-vehicle communication.

The safety monitor may influence the control of the vehicle via various outputs to different components or units.

In one possible implementation, the safety monitor outputs a piece of information, for example, that a departure has been made from an intended operating range or that the traffic situation does not correspond to the available possible sequences for the corresponding zone graph, and the vehicle is controlled as a function of same.

In a further possible implementation, the safety monitor outputs conditions or limits for a possible safety maneuver. These conditions or limits may be provided, for example, in the form of new occupied zones, a blocked zone, a recommendation for an evasive trajectory, a line set, or in the form of polygons or as a region via which costs of a cost function are linked. These conditions or limits may then be transmitted in particular to a behavior planner, trajectory planner, or maneuver planner 1407 or similar modules in the vehicle in order to compute a safe behavior or a safe trajectory for the vehicle.

In a further possible implementation, the safety monitor directly computes a safe maneuver, possibly including the computation of a trajectory. The computed maneuver may then be transmitted to a control unit 1408 of the vehicle, which appropriately controls the vehicle.

Three possible examples of the provided methods are presented in FIGS. 15 through 19.

Figure 15:
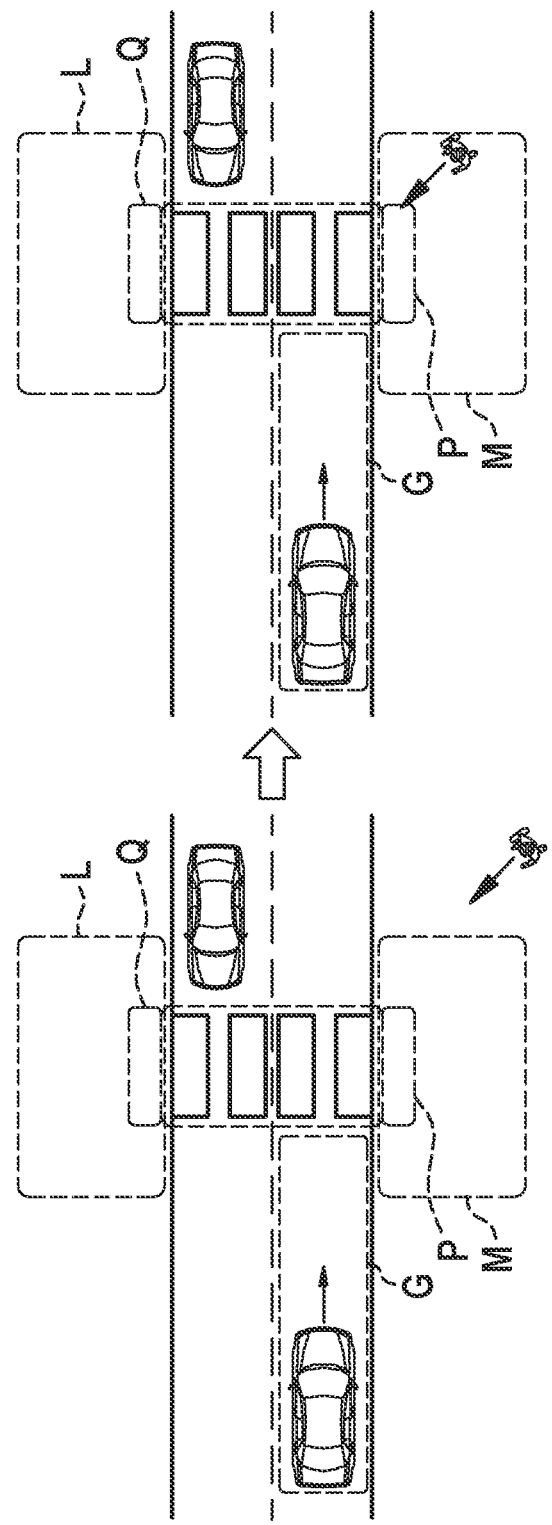
FIG. 15 shows a further example of a traffic situation in which a pedestrian exhibits behavior outside an intended context.

FIG. 15 shows a further example of a traffic situation in which a pedestrian is exhibiting behavior outside an intended context. This involves a situation that is comparable to that described for FIG. 13. Once again, two vehicles are traveling in opposite directions in different lanes toward a crosswalk, and a pedestrian is approaching the crosswalk from outside the roadway. Zones G, L, M, P, Q are once again denoted corresponding to FIG. 13.

In this example, an object whose behavior is outside the assumptions about its movement options, which may result in a hazardous situation, is detected. The morphological behavior analysis in combination with the zone graph determines that the vehicle in question must brake in zone G in front of the crosswalk if a pedestrian is situated in one of zones M, P, L, Q or on the crosswalk. The size of zones M and P is once again computed based on assumptions about the expected movement properties of the involved road users. These assumptions include, for example, the maximum speed and maximum acceleration of the road users, as well as their option for a change of direction.

The safety monitor now monitors objects or road users outside the zones, and determines whether their behavior matches the existing model assumptions, and in particular, whether in the future they could enter into one of the designated zones specifically due to such an unexpected behavior. If such a case is present, this may be a traffic situation outside the assumptions for which the vehicle has been tested and approved. Such traffic situations are to be recognized before a hazardous situation results.

Figure 16:
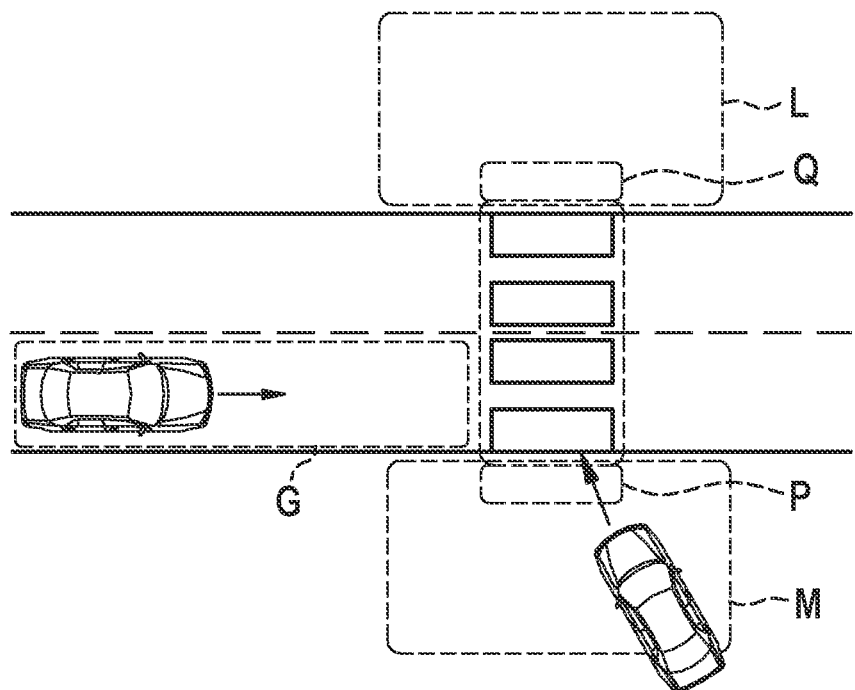
FIG. 16 shows an example of a traffic situation in which a vehicle is detected in a zone not intended for vehicles.

FIG. 16 shows an example of a traffic situation in which a vehicle is detected in a zone not intended for vehicles.

The vehicle in question is moving toward a crosswalk. Zones G, L, M, P, Q are once again denoted corresponding to FIG. 13.

The safety monitor has access to information concerning which objects or road users are allowed in which zones. The safety monitor is thus able to recognize when objects or road users are situated in a zone that is not intended for them. In a zone graph including a crosswalk as shown in FIG. 16, it may be provided, for example, that only pedestrians are allowed to be present in zones P, M, L, and Q. In FIG. 16 a second vehicle is now in zone M, which thus represents a violation of the assumptions made. The safety monitor may correspondingly establish this violation.

Figure 17:
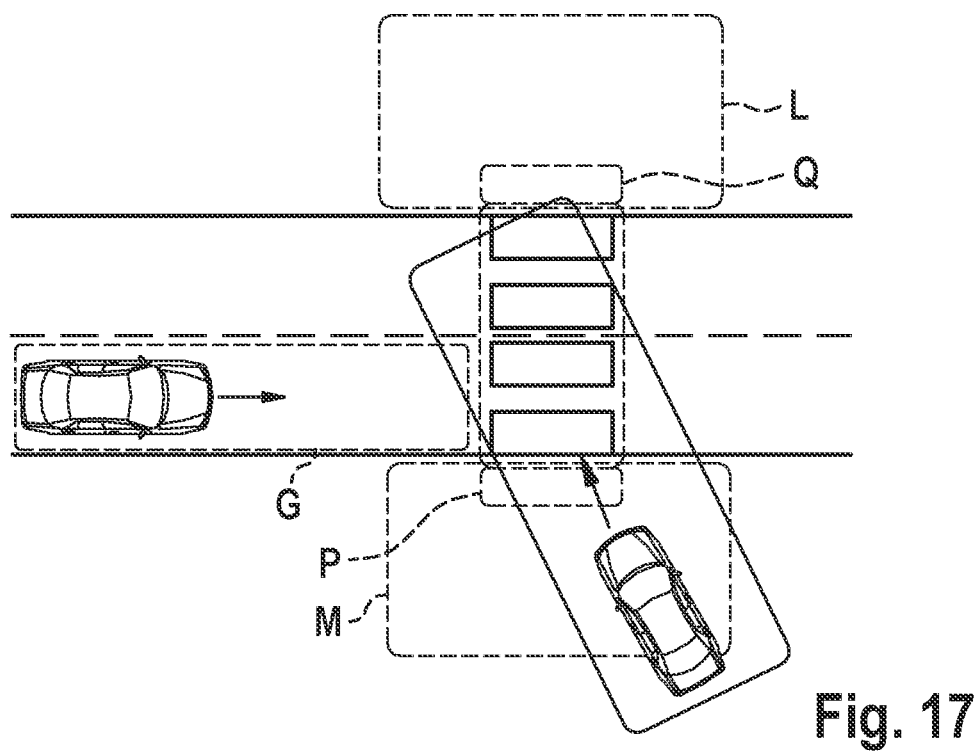
FIG. 17 shows an example of an alternative response for a traffic situation corresponding to FIG. 16.

FIG. 17 shows an example of an alternative response for a traffic situation corresponding to FIG. 16. FIG. 17 shows the identical traffic situation as in FIG. 16, merely supplemented by a further zone for the second vehicle, which is unexpectedly situated in zone M. Such a supplementation may be made by the safety monitor as a measure or an alternative response if the traffic situation does not correspond to any of the possible or provided sequences. This is possible in particular when the detected object, in the present case the second vehicle in zone M, belongs to a known class of objects, and a model for its behavior is thus available. This model may then be used to compute a new zone for the second vehicle which takes into account the possible or expected movement profile of the vehicle.

In one alternative embodiment, the safety monitor could merely signal to a further entity in the vehicle that the safety monitor has recognized an unexpected traffic situation or that an object or road user is situated in an unexpected zone. Such a further entity may in particular also prompt an output to a driver via HMI.

FIG. 18 shows an example of a traffic situation in which the behavior of a pedestrian takes the vehicle out of an intended operating range. In this traffic situation, once again a vehicle is moving toward a crosswalk. Zones G, L, M, P, Q are once again denoted corresponding to FIG. 13. In addition, four traffic lights are shown, two for vehicles situated on the roadway in front of the crosswalk, and one each for pedestrians on each side of the crosswalk. In both settings of the traffic situation, the traffic lights for the vehicles are green, and the traffic lights for the pedestrians are red.

In the first setting, the vehicle in question is moving toward the crosswalk, and a pedestrian in zone M is likewise approaching the crosswalk. In the second setting, the vehicle has further approached the crosswalk, and the pedestrian has stepped into the crosswalk from zone M via zone P.

In this case, the appearance of the pedestrian in zone M and his/her movement behavior is within the provided limits and model assumptions. In the first setting, the pedestrian is present in a zone that is relevant for the behavior of the vehicle. However, there may now be additional limitations on allowable behaviors of road users in the intended operating range (ODD). For example, it may be assumed that other road users comply with traffic regulations. Accordingly, violations of traffic regulations may then be defined as a traffic situation outside the intended operating range (ODD), for example the pedestrian stepping into the crosswalk despite a red pedestrian traffic light. Thus, this is an unexpected and potentially hazardous traffic situation.

Figure 19:
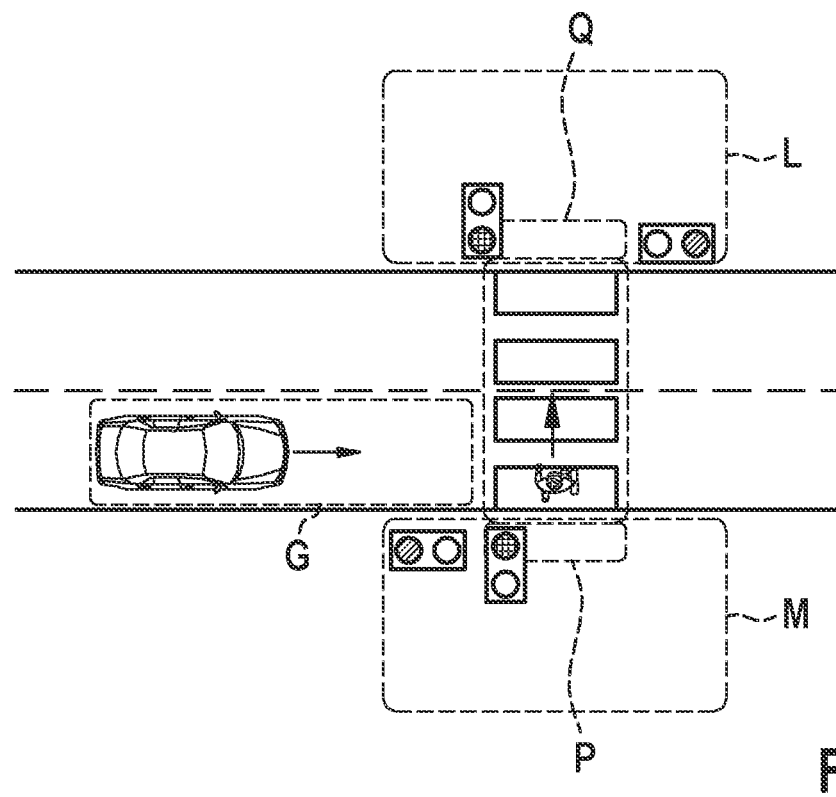
FIG. 19 shows an example of an alternative response for a traffic situation corresponding to FIG. 18.

FIG. 19 shows an example of an alternative response for a traffic situation corresponding to FIG. 18, and shows a situation corresponding to the second setting from FIG. 18.

A traffic light state may be incorporated as a property for the sequences in question via an appropriate expansion of the morphological behavior analysis. If the assumption is now made that the road users are complying with traffic regulations, for the combination of "pedestrian is crossing the road at the crosswalk" and "traffic light at the crosswalk is red" it is established that this corresponds to a situation outside the expected operating range. This information is available to the safety monitor, which may correspondingly identify the present traffic situation as critical and initiate a suitable, safe countermeasure by the vehicle.

Even though the described examples have been illustrated based on traffic situations at crosswalks, the provided methods, in particular using a safety monitor, may be used for all types of traffic situations and various intended operating ranges, for example in city traffic, expressway traffic, or in limited areas.

What is claimed is:

1. A computer-implemented method for controlling a vehicle, comprising the following steps:
    reading in data of a digital road map;
    determining zones for the digital road map;
    ascertaining possible sequences of trips along a road on the digital road map as a function of the determined zones;
    ascertaining, as a function of sensor data and/or current driving data of the vehicle, whether a current or predicted traffic situation is outside the possible sequences or corresponds to a possible sequence that is determined as being outside an intended operating range, wherein at least one of the determined zones is a dynamic zone having a size that depends on a speed of the vehicle, a position of the vehicle, and a behavior model that takes into account a position or a speed of another vehicle;
    determining a measure to be taken when the current or predicted traffic situation is outside the possible sequences or corresponds to the possible sequence outside the intended operating range; and
    controlling the vehicle as a function of the measure to be taken, wherein:
    at least another of the determined zones is a static zone having a size that is independent of the speed of the vehicle and independent of the speed of the other vehicle, and
    the dynamic zone is nested within the static zone and represents a still sufficient distance for the vehicle to perform an action within the static zone.

2. The method as recited in claim 1, wherein the ascertainment of whether the current or predicted traffic situation is outside the possible sequences includes an ascertainment of whether a detected object outside the designated zones may be relevant for the current or predicted driving situation due to a determined or assumed movement of the detected object, the detected object being a road user.

3. The method as recited in claim 1, wherein the ascertainment of whether the current or predicted traffic situation is outside the possible sequences includes an ascertainment of whether a detected object is situated within one of the designated zones in which it is not expected, the detected object being a road user.

4. The method as recited in claim 1, wherein the measure that is taken includes an alternative response, or an initiation of a safety maneuver for the vehicle, or a generation of an additional possible sequence, as a function of which the vehicle is controlled, or an output of a piece of information to a behavior planning system or a trajectory planning system of the vehicle.

5. The method as recited in claim 1, wherein the method is carried out in the vehicle during a driving operation.

6. The method as recited in claim 1, wherein, in a simulation or as a function of recorded data, a behavior of the vehicle or of a vehicle system of the vehicle, is predicted for at least one of the possible sequences, and a control of the vehicle corresponding to one of the possible sequences takes place as a function of a comparison of the predicted behavior to at least one predetermined requirement.

7. The method as recited in claim 6, wherein the control of the vehicle includes control commands to a vehicle component for steering or deceleration or acceleration of the vehicle.

8. The method as recited in claim 6, wherein behavior planning or trajectory planning takes place as a function of the comparison, and the control takes place as a function of a result of the behavior planning or trajectory planning.

9. The method as recited in claim 8, wherein the measure includes a check of the behavior planning or trajectory planning, or an intervention into the behavior planning or trajectory planning.

10. The method as recited in claim 8, wherein the behavior planning or trajectory planning takes place as a function of the measure that is taken.

11. The method as recited in claim 6, wherein the predetermined requirement includes a traffic regulation or a safety requirement for a movement behavior of the vehicle or a comfort requirement according to a specification of the vehicle.

12. The method as recited in claim 2, wherein a property of the road user is ascertained from a behavior model for the road user, the behavior model being a physical movement model for the road user.

13. The method as recited in claim 1, wherein the digital map contains information concerning at least one road including lane markings, intersections, traffic lights, and traffic signs.

14. The method as recited in claim 1, wherein the digital map contains information concerning at least one road and/or at least one open space, concerning roadway width, roadway boundaries, positions or extents of a road or open space, curve radii, lane markings, intersections, traffic lights, and traffic signs.

15. The method as recited in claim 1, wherein the ascertainment of the possible sequences is a function of information concerning at least one further road user, or of information concerning an object that interferes with an intended behavior of the vehicle, wherein the at least one further road user is another vehicle or a pedestrian.

16. The method as recited in claim 1, wherein the possible sequences are ascertained as a function of further input variables, the further input variables including: information concerning external influences, or information concerning further road users, or information concerning a current or planned route of the vehicle, or information concerning the vehicle.

17. A non-transitory machine-readable memory on which is stored a computer program for controlling a vehicle, the computer program, when executed by a computer, causing the computer to perform the following steps:
reading in data of a digital road map;
determining zones for the digital road map;
ascertaining possible sequences of trips along a road on the digital road map as a function of the determined zones;
ascertaining, as a function of sensor data and/or current driving data of the vehicle, whether a current or predicted traffic situation is outside the possible sequences or corresponds to a possible sequence that is determined as being outside an intended operating range, wherein at least one of the determined zones is a dynamic zone having a size that depends on a speed of the vehicle, a position of the vehicle, and a behavior model that takes into account a position or a speed of another vehicle;
determining a measure to be taken when the current or predicted traffic situation is outside the possible sequences or corresponds to the possible sequence outside the intended operating range; and
controlling the vehicle as a function of the measure to be taken, wherein:
at least another of the determined zones is a static zone having a size that is independent of the speed of the vehicle and independent of the speed of the other vehicle, and
the dynamic zone is nested within the static zone and represents a still sufficient distance for the vehicle to perform an action within the static zone.

18. A vehicle configured to:
read in data of a digital road map;
determine zones for the digital road map;
ascertain possible sequences of trips along a road on the digital road map as a function of the determined zones;
ascertain, as a function of sensor data and/or current driving data of the vehicle, whether a current or predicted traffic situation is outside the possible sequences or corresponds to a possible sequence that is determined as being outside an intended operating range, wherein at least one of the determined zones is a dynamic zone having a size that depends on a speed of the vehicle, a position of the vehicle, and a behavior model that takes into account a position or a speed of another vehicle;
determine a measure to be taking when the current or predicted traffic situation is outside the possible sequences or corresponds to the possible sequence outside the intended operating range; and
control the vehicle as a function of the measure to be taken, wherein:
at least another of the determined zones is a static zone having a size that is independent of the speed of the vehicle and independent of the speed of the other vehicle, and
the dynamic zone is nested within the static zone and represents a still sufficient distance for the vehicle to perform an action within the static zone.

19. The method as recited in claim 1, wherein the action is a deceleration of the vehicle to a stop.

20. A computer-implemented method for controlling a vehicle, comprising the following steps:
reading in data of a digital road map;
determining zones for the digital road map;
ascertaining possible sequences of trips along a road on the digital road map as a function of the determined zones;
ascertaining, as a function of sensor data and/or current driving data of the vehicle, whether a current or predicted traffic situation is outside the possible sequences or corresponds to a possible sequence that is determined as being outside an intended operating range, wherein at least one of the determined zones is a dynamic zone having a size that depends on a speed of the vehicle, a position of the vehicle, and a behavior model that takes into account a position or a speed of another vehicle;
determining a measure to be taken when the current or predicted traffic situation is outside the possible sequences or corresponds to the possible sequence outside the intended operating range; and
controlling the vehicle as a function of the measure to be taken, wherein the size of the dynamic zone further depends on a weather condition.

21. The non-transitory machine-readable memory as recited in claim 17, wherein the action is a deceleration of the vehicle to a stop.

22. A non-transitory machine-readable memory on which is stored a computer program for controlling a vehicle, the computer program, when executed by a computer, causing the computer to perform the following steps:
reading in data of a digital road map;
determining zones for the digital road map;
ascertaining possible sequences of trips along a road on the digital road map as a function of the determined zones;
ascertaining, as a function of sensor data and/or current driving data of the vehicle, whether a current or predicted traffic situation is outside the possible sequences or corresponds to a possible sequence that is determined as being outside an intended operating range, wherein at least one of the determined zones is a dynamic zone having a size that depends on a speed of the vehicle, a position of the vehicle, and a behavior model that takes into account a position or a speed of another vehicle;
determining a measure to be taken when the current or predicted traffic situation is outside the possible sequences or corresponds to the possible sequence outside the intended operating range; and
controlling the vehicle as a function of the measure to be taken, wherein the size of the dynamic zone further depends on a weather condition.

23. The vehicle as recited in claim 18, wherein the action is a deceleration of the vehicle to a stop.

24. A vehicle configured to:
read in data of a digital road map;
determine zones for the digital road map;
ascertain possible sequences of trips along a road on the digital road map as a function of the determined zones;
ascertain, as a function of sensor data and/or current driving data of the vehicle, whether a current or predicted traffic situation is outside the possible sequences or corresponds to a possible sequence that is determined as being outside an intended operating range, wherein at least one of the determined zones is a dynamic zone having a size that depends on a speed of the vehicle, a position of the vehicle, and a behavior model that takes into account a position or a speed of another vehicle;

determine a measure to be taking when the current or predicted traffic situation is outside the possible sequences or corresponds to the possible sequence outside the intended operating range; and control the vehicle as a function of the measure to be taken, wherein the size of the dynamic zone further depends on a weather condition.

* * * * *